(12) United States Patent
Shirai

(10) Patent No.: US 7,944,169 B2
(45) Date of Patent: May 17, 2011

(54) SOLAR-PANEL APPARATUS FOR A VEHICLE

(76) Inventor: Tsukasa Shirai, Toyohasi (JP)

( * ) Notice: Subject to any disclaimer, the term of this patent is extended or adjusted under 35 U.S.C. 154(b) by 836 days.

(21) Appl. No.: 11/845,636

(22) Filed: Aug. 27, 2007

(65) Prior Publication Data

US 2008/0018297 A1 Jan. 24, 2008

Related U.S. Application Data

(63) Continuation-in-part of application No. PCT/JP2006/304035, filed on Feb. 24, 2006, and a continuation-in-part of application No. 11/400,133, filed on Apr. 10, 2006, now abandoned.

(30) Foreign Application Priority Data

Mar. 31, 2004 (JP) .................................. 2004-132209
Feb. 26, 2005 (JP) .................................. 2005-089737

(51) Int. Cl.
*H01M 10/44* (2006.01)
(52) U.S. Cl. .......................... 320/101; 320/103; 320/104
(58) Field of Classification Search .................... 320/101
See application file for complete search history.

(56) References Cited

U.S. PATENT DOCUMENTS

| | | | | |
|---|---|---|---|---|
| 4,911,257 A | * | 3/1990 | Kajimoto et al. | .......... 180/65.22 |
| 5,726,505 A | * | 3/1998 | Yamada et al. | ............... 307/127 |
| 5,779,817 A | * | 7/1998 | Wecker | .......................... 136/244 |
| 5,986,429 A | * | 11/1999 | Mula, Jr. | ........................ 320/101 |
| 6,448,740 B1 | | 9/2002 | Kirkpatrick | |

FOREIGN PATENT DOCUMENTS

| JP | 59-155843 | 10/1984 |
|---|---|---|
| JP | 60-65157 | 5/1985 |
| JP | 61-50015 | 4/1986 |
| JP | 63-124732 A | 5/1988 |
| JP | 63-133839 | 6/1988 |
| JP | 1-157536 A | 10/1989 |
| JP | 2-85009 | 3/1990 |
| JP | 2-79142 | 6/1990 |
| JP | 3-118140 A | 12/1991 |
| JP | 7-164870 A | 6/1995 |
| JP | 7-316850 | 12/1995 |

(Continued)

*Primary Examiner* — Edward Tso
*Assistant Examiner* — Johali A Torres Ruiz
(74) *Attorney, Agent, or Firm* — Matthias Scholl, PC; Matthias Scholl

(57) ABSTRACT

The positive and negative pole of the DC-battery 2-1 is allowed to connect the solar panel 2-11 and the solar panel 2-14 when the key position of the ignition switch 2-15 is in positions of "on" and "acc". The positive and negative pole of the DC-battery 2-1 is not connected to the solar panel 2-11 and the solar panel 2-14 when the key position of the ignition switch 2-15 is in the position of "lock" and "start". To attain such a configuration, lead wire connects the ignition switch 2-15 utilizing relay 2-4-*a* and fuse box 2-4-*b*. When the position of the ignition key is in "on" and "acc", positive pole of the solar panels 2-11 and the solar panel 2-14 are connected to the positive pole of the DC battery 2-1 via the relay 2-4-*b*. Relays 3-4, 3-15, 3-16, 4-4, 4-15, and 4-16 are similar to the relay 2-4-*b*.

2 Claims, 17 Drawing Sheets

FOREIGN PATENT DOCUMENTS

| | | |
|---|---|---|
| JP | 8-76865 | 3/1996 |
| JP | 10-234102 | 9/1998 |
| JP | 10-237358 | 9/1998 |
| JP | 11-220805 | 8/1999 |
| JP | 11-342731 | 12/1999 |
| JP | 2001-99706 | 4/2001 |
| JP | 2001-105842 | 4/2001 |
| JP | 2002-309622 | 10/2002 |
| JP | 2003-143705 A | 5/2003 |
| JP | 2003-176425 | 6/2003 |
| JP | 3098306 | 2/2004 |

* cited by examiner

SOLAR-PANEL APPARATUS FOR A VEHICLE

CROSS-REFERENCE TO RELATED APPLICATIONS

This application is a continuation-in-part of International PCT Patent Application No. PCT/JP2006/304035 filed on Feb. 24, 2006 and is a continuation-in-part of U.S. Utility patent application Ser. No. 11/400,133 filed on Apr. 10, 2006. This application further claims priority benefits to Japanese Patent Application No. 2004-132209 filed on Mar. 31, 2004 and to Japanese Patent Application No. 2005-089737 filed on Feb. 26, 2005. The contents of the specifications of all of these applications are incorporated herein by reference for all purposes.

BACKGROUND OF THE INVENTION

1. Field of the Invention

This invention relates to a solar panel apparatus for a motor vehicle which improves energy efficiency and battery lifetime, and can protect the exterior coating of a vehicle from corrosion.

2. Brief Description of the Related Arts

Japanese unexamined Utility Model Publication No. H02-79142 to Mikihiko Onda discloses a charging device comprising a battery, a solar panel on roof of an automobile for providing electricity for the battery, a dynamo-electric generator providing electricity for the battery, and a bypass circuit absorbs an overcharged electricity of the battery.

Japanese published unexamined patent application H07-316850 discloses the method of electric anticorrosion of the external power source system in which a solar battery provides anticorrosion current so that rust prevention can constantly be done at time zone such as nighttime.

The method of H07-316850 as the general method of the electric anticorrosion is comprised of seven elements in the FIG. 2 thereof. The elements are a solar panel, an electric cable from a positive pole of the solar panel to an anode plate, an insulator with this anode plate, water, a defended material against the corrosion, and an electric cable from the defended material against the corrosion to a negative pole of the solar panel.

In such conventional invention, improved fuel-efficiency is relatively low, a battery has low rates of life expectancy, and a coated surface of an exterior of a vehicle has a high affinity toward dust and dirt.

SUMMARY OF THE INVENTION

Accordingly, the present invention has been made to solve the above-mentioned problems occurring in the prior art, and it is an object of the present invention to provide an electric supplemental apparatus for a vehicle, which can improve energy efficiency and lifetime of the battery, and can attain anticorrosion exterior coating of a vehicle.

It is another object of this invention is to improve the efficiency of an air conditioner for a vehicle.

To accomplish the above object, there is provided an electric supplemental apparatus for a vehicle comprising: an ignition switch for the vehicle; a battery for the vehicle; a solar panel being provided with the vehicle; and an electric circuit connecting the ignition switch, the battery and the solar panel; wherein the electric circuit connects the battery and the solar panel in the case when a key in the ignition switch is in positions of "on" and "acc".

The ignition switch has positions for "LOCK", "ACC", "ON", and "START". Since the electricity is supplied from the solar panel to the battery, fuel efficiency is improved. Since the electric circuit connects the battery and the solar panel in case that a key in the ignition switch is in position of "on" and "acc", overcharge of electricity from the solar panel to the battery is prevented and lifetime of the battery is improved. In the position of "START", the electric circuit connects the battery and the solar panel.

Moreover, the decrease of the engine rotation occurs, and tiredness of vehicle driving is decreased.

Electricity output of the solar panel is set to be between 0.05 W and 1 kW, preferably between 2 W and 1 kW for a compact car. The solar panel is installed at the top of the bonnet, the roof, or the trunk.

The upper limit of the solar panel is set to the extent possible on the vehicle. In consideration of durability of AC dynamo, the electric current value of the recharge electricity of the battery. The solar panel can cover the upper whole part of the vehicle without being remodeled in the existing parts of the automobile. A large-sized track loads a solar panel with the power rating above 1 kW.

In the case that the solar panel provides too much amount of electricity output to the battery, the durability of the devices of the automobile needs be exchanged at the existing devices of the automobile, or the electric power is decreased by control apparatus such as a shutter apparatus or a resistor or an on/off switch etc. When there is provided a plurality of solar panels, it is possible to decrease electric current by providing a countercurrent prevention circuit.

It is preferred that the electric circuit has a switch which sets the electric power input to the battery at least two steps.

It is possible to send a great deal of electric power to the automobile battery from the solar panel, and it is possible to do a little or no electricity supply to the automobile battery from the solar panel, thereby prolonging the lifetime of the battery. A way of an electricity input by at least two steps from the solar panel to the automobile battery is preferably attained by opening and shutting of the shutter apparatus which covers a solar panel.

The solar panel has a first solar panel and a second solar panel that is smaller than the first solar panel, the first solar panel is connected to the battery when the key is in the position, and the second solar panel is constantly connected to the battery.

A switch is provided between the battery and the solar panel so that a connection state in the key position is switched to an always-connection state between the battery and the solar panel during driving.

Since the connection state can be switched, the solar panel can powerfully charge to the DC-battery before vehicle start.

An on/off switch is provided between the battery and the solar panel so that all connection between the battery and the solar panel is cutoff in case that an overcharge of the battery occurs during driving, stopping, and parking.

The on/off switch can cut the connection between the solar panel and the battery. The on/off switch is preferably installed such that a driver is able to operate from an operation seat. The on/off switch is preferably controlled by a microcomputer. With this on/off switch, the overcharge to the battery can be prevented. The generated electricity from the AC dynamo to the battery can fully be stopped. It is preferable that the on/off switch is provided with both of the wiring of the negative and positive poles of the solar panel.

The solar panel is provided with a switch for switching a supply state where electric output is supplied from the solar panel to the battery and a circulation state where a positive pole and a negative pole of the solar panel are connected to both ends of a body metal of the vehicle, respectively, so that the solar panel functions as an electric current circulation apparatus.

The solar panel has a first solar panel and a second solar panel such that the output of the second panel is lower than that of the first solar panel, an electric power which is generated at the second solar panel can be adjusted by a shutter apparatus which cover the second solar panel, or by a potentiometer or a combination of resistors which lowers the output of the second solar panel, and the second solar panel is in always-connection with the battery irrespective of the position of the key in the ignition switch, and the solar panel is smaller than the first solar panel.

This mechanism to charge the battery prevents the overcharge from the solar panel to the battery. Output of the second solar panel is preferably less than 0.6 W, more preferably between 0.01 and 0.3 W.

In additional embodiments, provided is an electric supplemental apparatus for a vehicle comprising: a battery for the vehicle; a solar panel being provided with the vehicle; a shutter apparatus for covering the solar panel so that light input into the panel is adjusted; and an electric circuit connecting the battery and the solar panel; and potentiometer, a resistor, or an on/off switch, or a combination thereof which lowers the output of the solar panel to the battery.

In additional embodiments, provided is an electric supplemental apparatus for a vehicle comprising: a battery for the vehicle; a solar panel being provided with the vehicle; and an electric circuit connecting the battery and the solar panel; wherein both ends of a body metal of the vehicle are connected to a positive pole and a negative pole of the solar panel, respectively, so as to circulate electrical current through the body metal.

It is preferable that the switch provided for switching a first state the solar panel is connected to the battery to charge the battery, and a second state where electricity is circulated through the body metal from the charging to a battery by the solar panel. The coated surface of the vehicle receives the circulation and discharge of the electricity so that the anticorrosion phenomenon of the vehicle and the effective functioning of the vehicle body are attained.

DETAILED DESCRIPTION OF THE INVENTION

Figure 1:
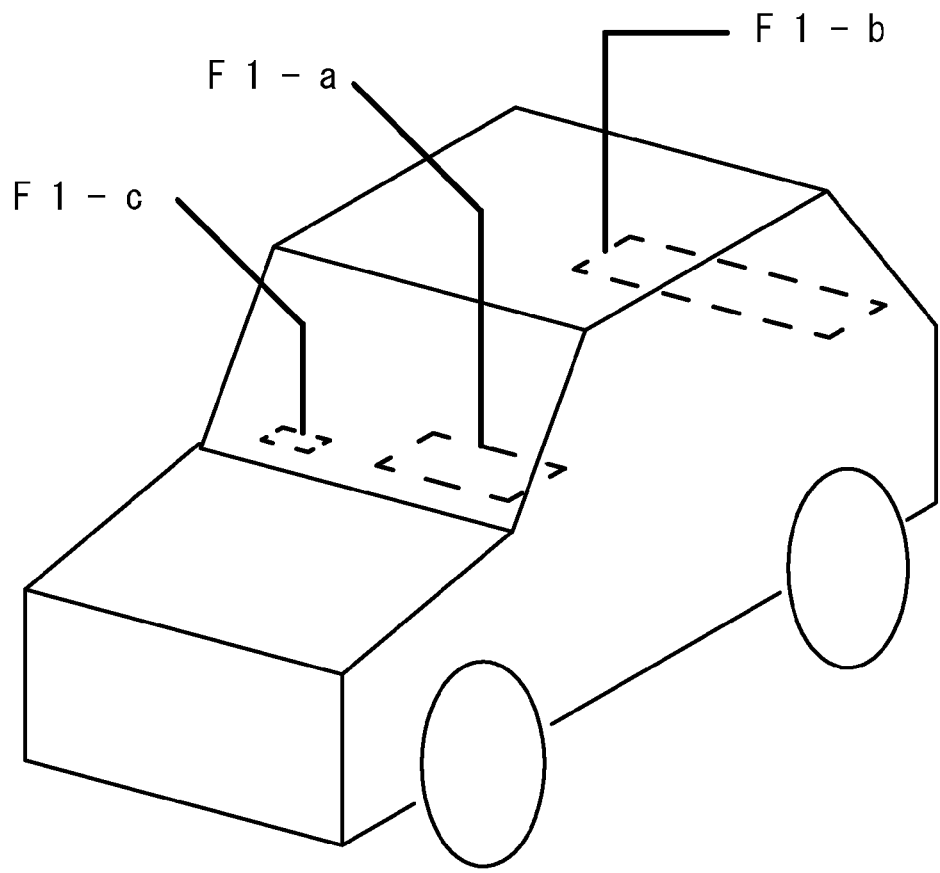
FIG. 1 is a perspective view of a solar apparatus according to the invention.
Figure 5:
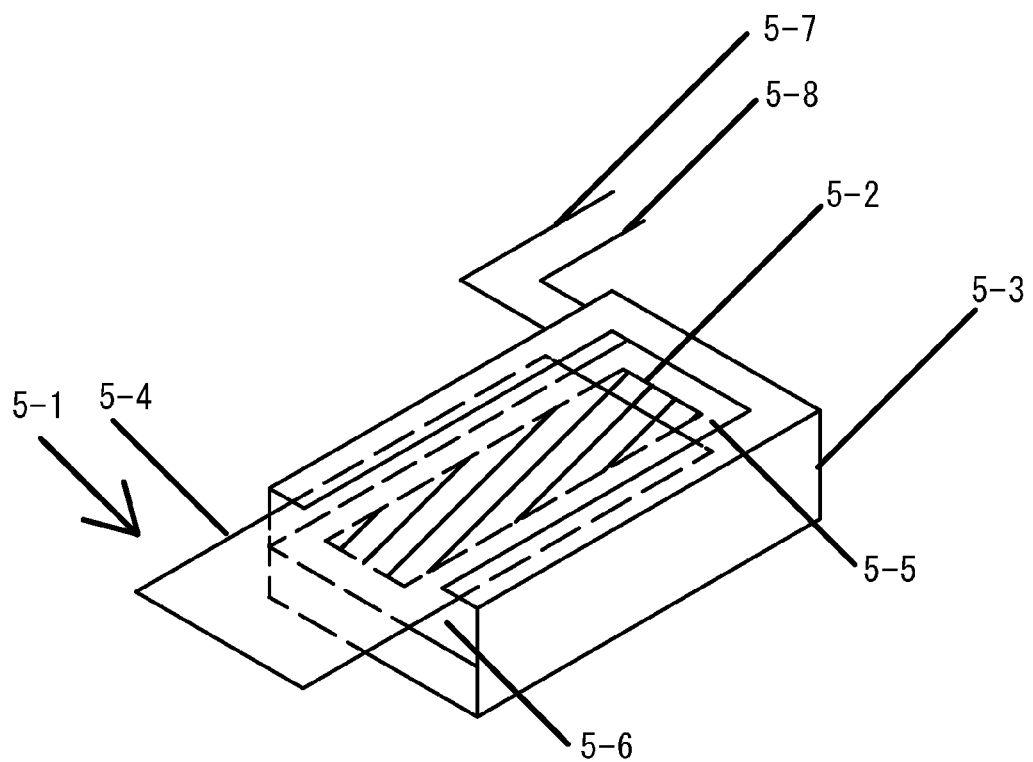
FIG. 5 is a perspective view of a shutter apparatus according to this invention.
Figure 6:
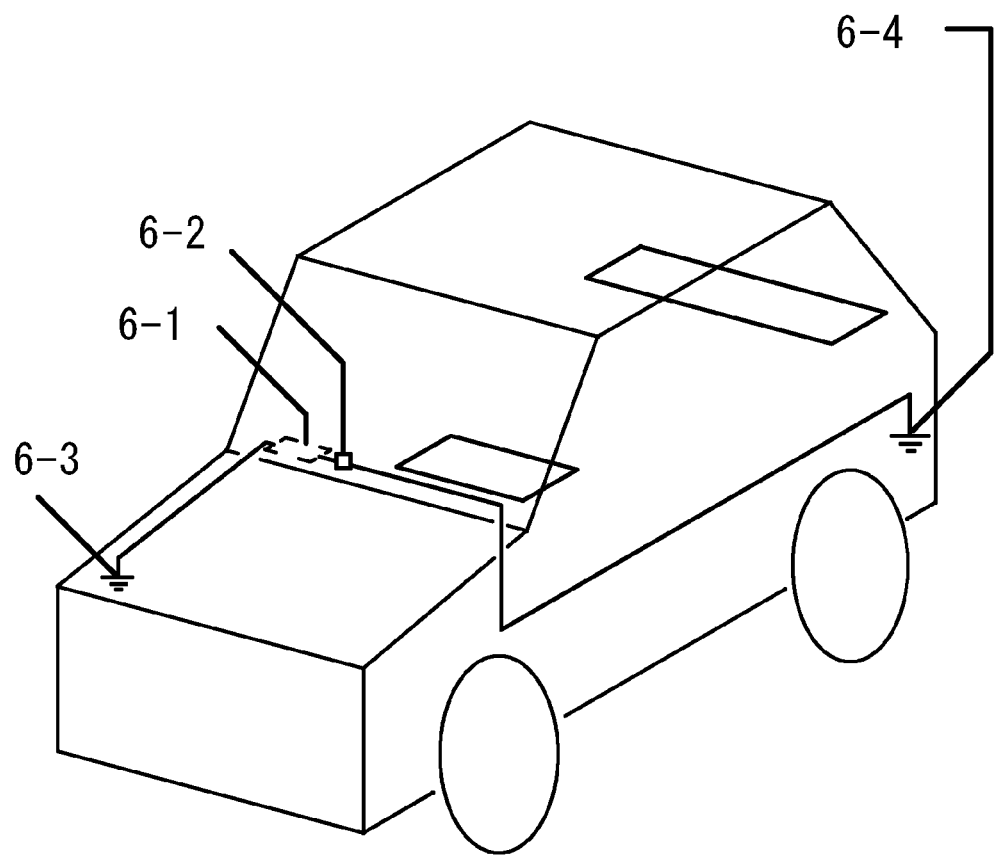
FIG. 6 is a perspective view of a solar panel F1-*c* of FIG. 1.

Hereinafter, with reference to FIGS. 1-17, the structure of an electric supplemental apparatus for a vehicle will be described in detail. FIG. 1 shows the appearance of the automobile provided with a front solar apparatus F1-*a*, a rear solar apparatus F1-*b*, and a solar apparatus F1-*c* for an anticorrosion system. In order to utilize sunlight in addition to a gasoline or diesel oil, etc, the front solar apparatus F1-*a* is provided with a solar panel apparatus on the inner place of a dashboard of an automobile, the rear solar apparatus F1-*b* is provided with a solar panel apparatus on the inner place of a rear part of the automobile, and the solar apparatus F1-*c* is provided with a solar panel apparatus as shown in FIG. 6 in which the electricity is circulated through the automobile metal body while the solar panels F1-*a* and F1-*b* generate electricity to charge the battery.

The solar panels F1-*a*, and F1-*b* are installed inside the automobile to avoid visually undesirable appearance, short life time, non-waterproof, high cost, and complicated structure. The solar panels F1-*a* and F1-*b* are provided near the window because of fuel consumption improvement, the driving stability, and light-receiving stability.

Figure 2:
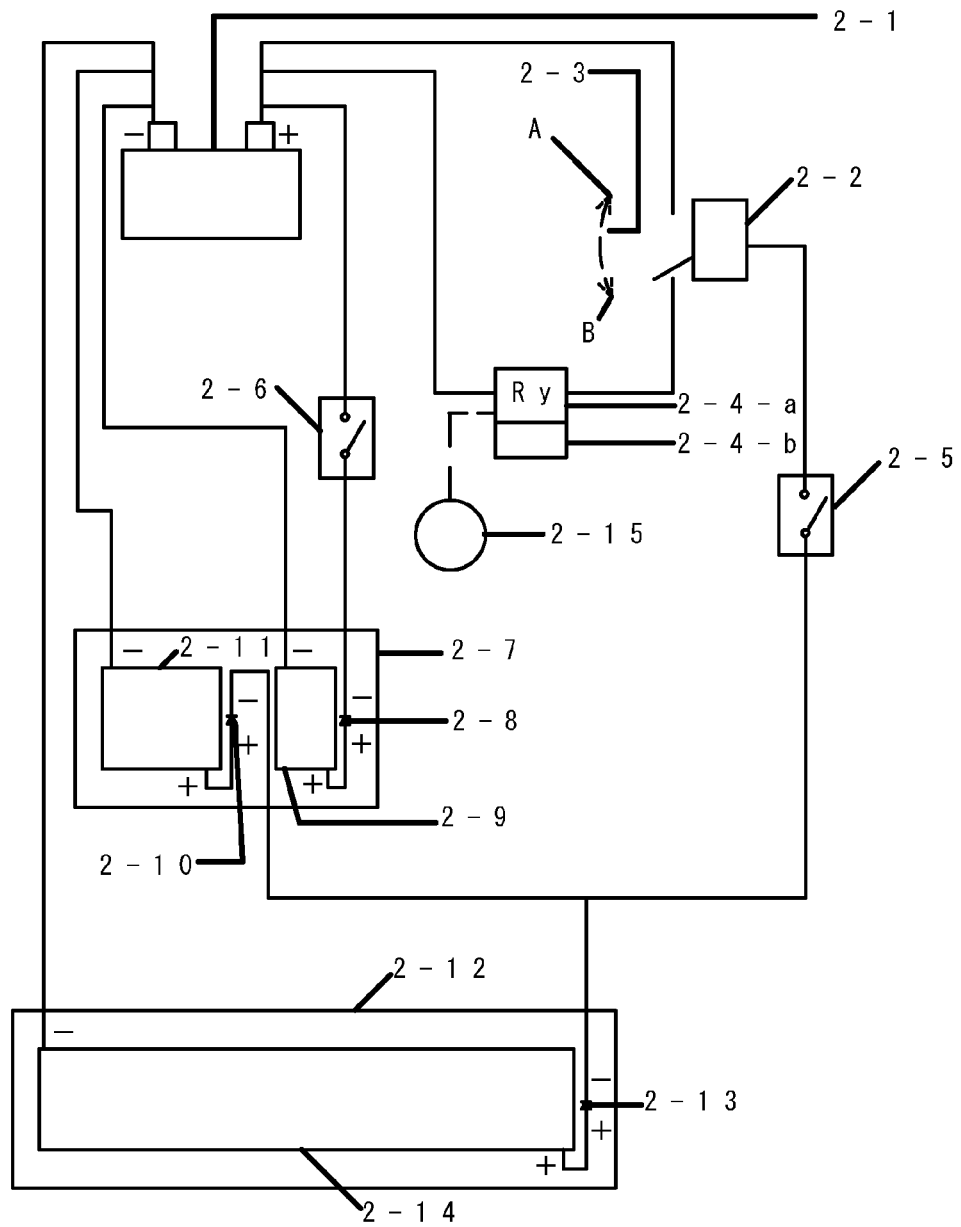
FIG. 2 is a block schematic diagram of a first embodiment of this invention.

Hereinafter, referring to FIG. 2, a first embodiment of an electric supplemental apparatus for a vehicle will be described in detail. In FIG. 2, the DC-battery 2-1 is a GS BATTERY of JIS 38B19 made of GS Yuasa Battery Ltd. in Japan. The maximum size is, e.g., length 187 mm, width 127 mm, and height 203 mm (overall height 227 mm). A positive pole of a DC-battery 2-1 is connected to a toggle switch 2-2. The toggle switch 2-2 is changed over as shown reference numeral 2-3. At a B position of the toggle switch 2-2, the positive pole of the DC-battery 2-1 is connected to the toggle switch 2-2 via a relay 2-4*a* with a fuse 2-4*b* to which an ignition switch 2-15, the so called an Ignition key cylinder, is connected. At the A position of the toggle switch 2-2, the positive pole of the DC-battery 2-1 is connected to the toggle switch 2-2 without the relay 2-4*a* and the fuse 2-4*b*. The toggle switch 2-2 is connected to a semiconductor diode 2-10 via an on/off switch 2-5, and to a semiconductor diode 2-13 via the on/off switch 2-5, respectively. The positive pole of the DC-battery 2-1 is connected to a semiconductor diode 2-8 via an on/off switch 2-6. The diode 2-8 is connected to a solar panel 2-9. A front solar apparatus 2-7 comprises the diode 2-8, a solar panel 2-9, the diode 2-10, and a solar panel 2-11. A rear solar apparatus 2-12 comprises the diode 2-13 and a solar panel 2-14. A negative pole of the DC-battery 2-1 is connected to negative poles of the solar panel 2-9, the solar panel 2-11 and the solar panel 2-14, respectively.

The solar apparatus 2-7 is placed on the dashboard of the automobile and the solar apparatus 2-12 is placed in the rear part of the automobile. The board for placing the solar apparatus 2-7 and 2-12 and the diode, preferably, made of a material which is non-conductive (for example plastics), is not deformed by daylight, and flame-retardant. The dimension of the apparatus 2-7 is 200 mm wide by 341 mm long, and between 4 mm and 13 mm in thickness. The dimension of the apparatus 2-12 is 200 mm wide by 680 mm long, and between 4 mm and 13 mm in thickness.

Figure 3:
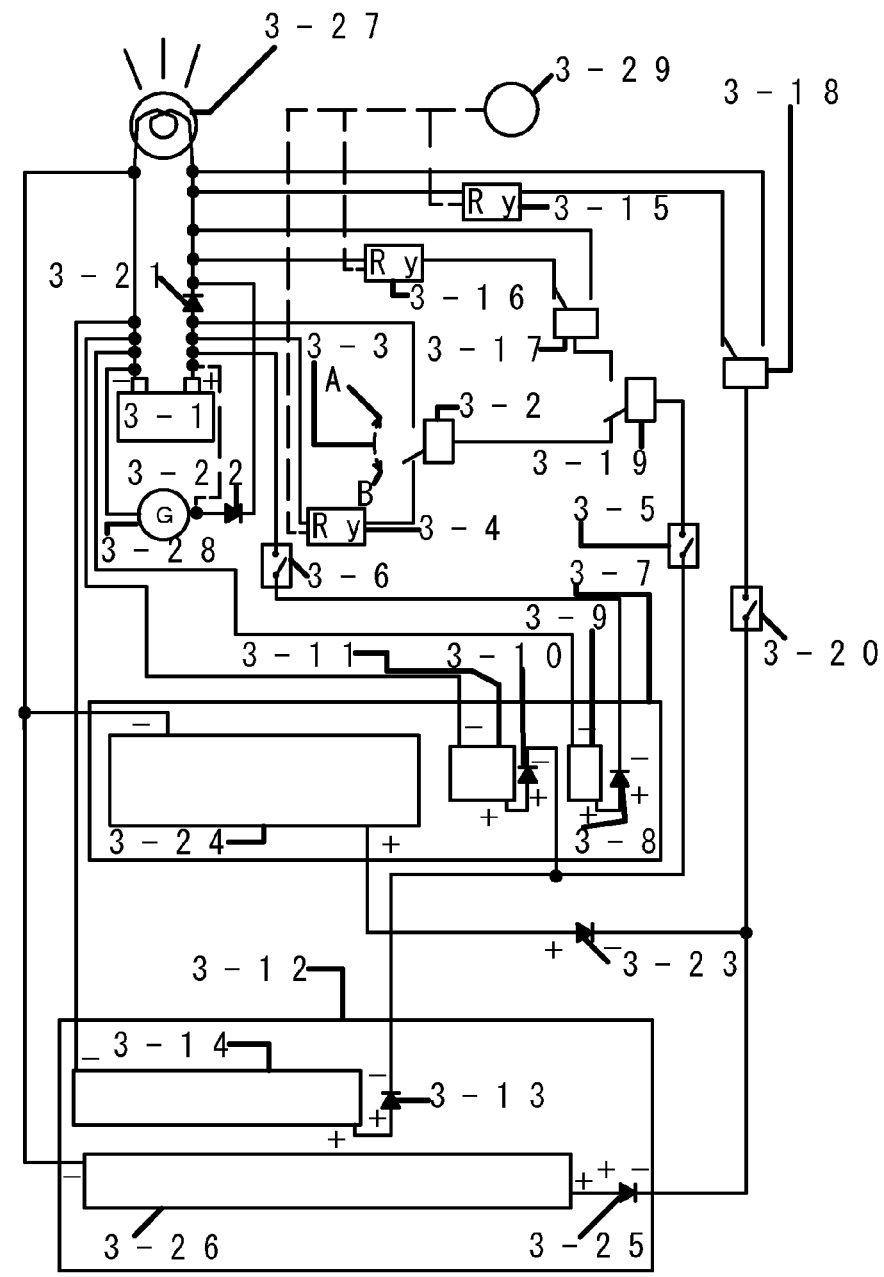
FIG. 3 is a block schematic diagram of a second embodiment of this invention.
Figure 4:
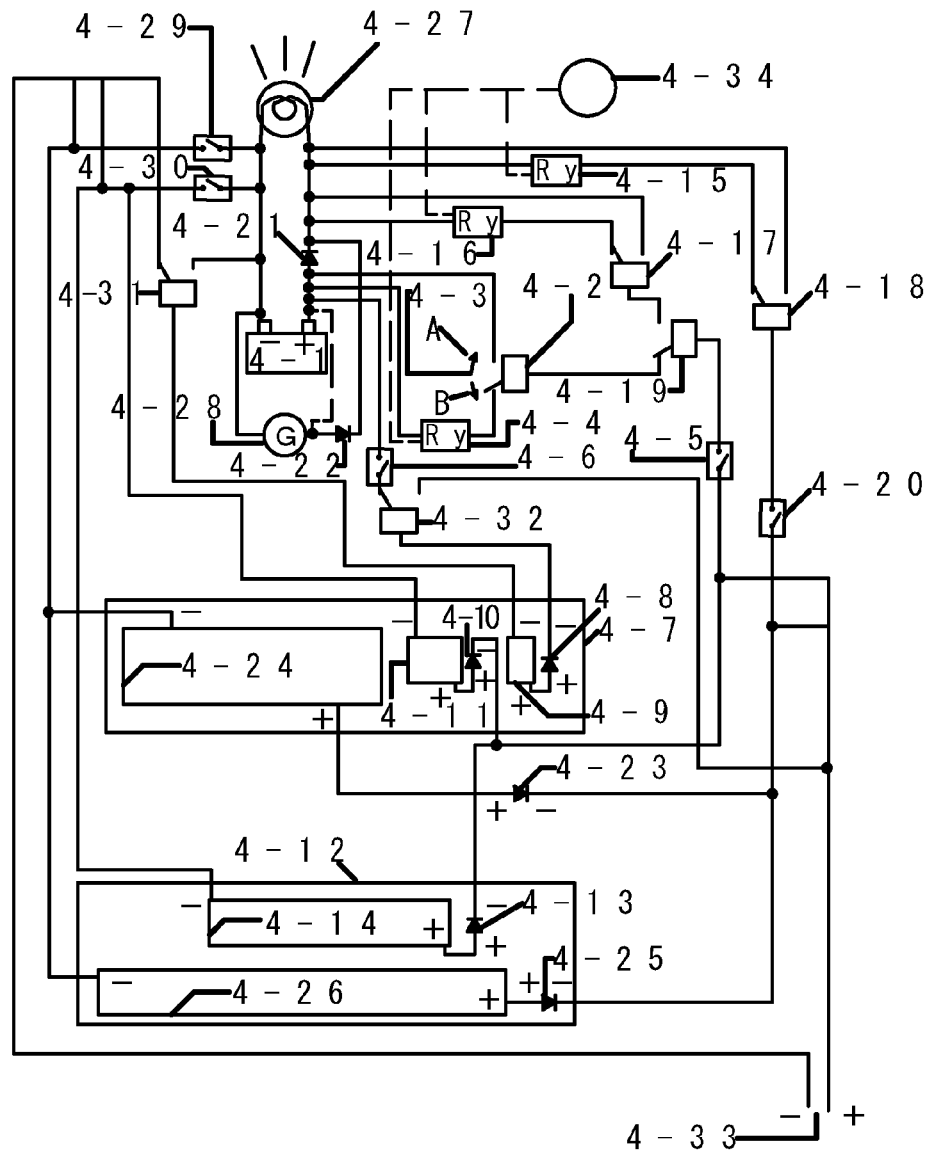
FIG. 4 is a block schematic diagram of a third embodiment of this invention.

As shown in FIG. 2, the solar panel 2-9 is constantly connected to the DC-battery 2-1 with voltage 15 V, current intensity 0.02 A, and power of 0.3 W. The panels 2-7 and 2-12 are not constantly connected to the DC-battery 2-1. The panel 2-9 is smaller than the panels 2-11, and the panel 2-11 is smaller than the panel 2-12. The size of the panel 2-9 is preferably set smaller than 15 mm in length and 30 mm in width. The panel 2-9 is provided with a shutter apparatus 5-1 as shown in FIG. 5. A solar panel 3-9 and a solar panel 4-9 as shown in FIGS. 3 and 4 are also provided with the shutter apparatus 5-1. The shutter apparatus 5-1 controls the amount of light received by the solar panels 2-9, 3-9, and 4-9 installed therein. The diode 2-8 having a maximum rating of 30 V and 0.45 A prevents electric current to flow from the battery 2-1 to the solar panel 2-9. All semiconductor diodes shown in FIGS. 2, 3, and 4 have the same function as the diode 2-8.

The diode 2-8 and the shutter apparatus 5-1 suppress the charge of the battery 2-1 by the solar panel 2-9. Battery life is prolonged, and the cost and the effort of DC-battery exchange decrease generally. The user-friendliness is better in the period of a half year or one year in case the amount of light received is restricted to some extent. Such a configuration of the solar panel of always-connection is also set not only in the 1st embodiment but also in the 2nd embodiment and the 3rd embodiment. While running, the on/off switch 2-6 is switched off by the driver in the case of overcharge due to input from an AC dynamo and the DC-battery 2-1. The switch 2-6 is installed in the place near a driver's seat suitable for operating the switch 2-6. For the same purpose, the on/off switches 2-5, 3-5, 3-6, 3-20, 4-5, 4-6, and 4-20 are also installed in the place near the driver's seat.

As shown in FIG. 2, during daytime operation of automobile, the solar panel 2-11 outputs 14 V, 0.4 A, and 5.6 W and the solar panel 2-14 outputs 15 V, 0.07 A, and 1.05 W. The solar panel 2-11 is connected to the diode 2-10 of maximum rating of 40 V and 3 A as an anti-reverse current function. The solar panel 2-14 is connected to the diode 2-13 having a maximum rating of 40 V and 5 A as an anti-reverse current function.

The positive and negative poles of the DC-battery 2-1 are allowed to connect the solar panel 2-11 and the solar panel 2-14 when the key position of the ignition switch 2-15 is in positions of "on" and "acc". The positive and negative pole of the DC-battery 2-1 is not connected to the solar panel 2-11 and the solar panel 2-14 when the key position of the ignition switch 2-15 is in the position of "lock" and "start". To attain such a configuration, lead wire connects the ignition switch 2-15 utilizing relay 2-4-a and fuse box 2-4-b. Relays 3-4, 3-15, 3-16, 4-4, 4-15, and 4-16 shown in FIG. 3 and FIG. 4 are substantially the same in function and capabilities as the relay 2-4-a, the fuse, and the fuse box 2-4-b. When the position of the ignition key is in "on" and "acc", positive pole of the solar panels 2-11 and the solar panel 2-14 are connected to the positive pole of the DC battery 2-1 via the relay 2-4-b. Relays 3-4, 3-15, 3-16, 4-4, 4-15, and 4-16 are similar to the relay 2-4-b.

Toggle switch 2-2 is switched from a position A to a position B, or vice versa as shown in the direction 2-3. In FIG. 2, the toggle switch 2-2 is connected to the relay 2-4-a and fuse 2-4-b at the position B. This connection means a connection at the time of automobile driving in positions of the above-mentioned "ON" and "ACC". In case that the toggle switch 2-2 is in turn over the position A, the solar panel 2-11 and 2-14 are always connected to the positive pole of the DC battery 2-1. The connection between the solar panel 2-9 and the battery 2-1 means an always-on connection. When the automobile is not in use, the toggle switch 2-2 should be set to position B. At this time, the electricity from the solar panel 2-11 and the solar panel 2-14 is not inputted. When the automobile is driven, it does not make any difference whether position A and B is selected. The electrical input from the solar panel 2-11 and the solar panel 2-14 are accepted at that time. The way of riding with good fuel efficiency, for example, the switch 2-2 is turned to position A 5 minutes before to start charging the solar panels 2-11 and 2-14, and when arriving at the destination, the engine is stopped and the switch 2-2 is turned to the position B. Another friendly way of riding, neither the toggle switch nor the on/off switch are operated with the switch 2-2 being the position B. The electricity is input to the battery 2-1 from the solar panels 2-11 and 2-14 during "on" position of the ignition switch 2-15. Those who do not know the system of this automobile could also drive this automobile freely, and fuel consumption is also able to be run well. The switch 2-2 is installed near the on/off switches 2-5 and 2-6, and the driver can operate the switch 2-2 from the driver's seat.

FIG. 3 shows a solar apparatus of a second embodiment which is similar to the apparatus of the first embodiment of FIG. 2. Hereinafter, differences between the apparatus of FIGS. 2 and 3 will be described. According to the 2nd embodiment shown in FIG. 3, the solar panel apparatus 3-7, and 3-12 are placed separately inside the vehicle at the front and the rear window pane, respectively, same as in the solar apparatus 2-7 and 2-12 arrangement of the 1st embodiment, but this 2nd embodiment features a different size and number of pieces of the solar panels, and is designed so as to enlarge the size.

The all time connection "always-on connection" is made with respect to the first solar panel 3-9 with 15V, 0.02 A, 0.3 W, small output in the daytime, and the panel 3-9 has the light income control shutter plate (a generating power stepless modification controller with the shutter plate) which shows only this first solar panel 3-9 in FIG. 3. A first semiconductor diode 3-8 of maximum rating 30 V, and 0.45 A, prevents electric current to flow from the battery 3-1 to a solar panel 3-9 of a 38B19 mold DC-battery. The diode 3-8 prevents the electrical and electric apparatus of the DC-battery 3-1 being opened, and passing along the inside of a solar panel. The wiring of the diode 3-8 and a stepless light income control shutter 5-1 of FIG. 5 has been described. During running, power is stably inputted from an AC dynamo, and also inputted from the solar panel 3-7. The on/off switch 3-6 can be turned off manually by the driver to prevent overcharging.

The second solar panel 3-11 outputs 15 V, 0.07 A, and 1.05 W, during daytime. The third solar panel 3-14 outputs 14 V, 0.4 A, and 5.6 W during daytime. The fourth solar panel 3-24 outputs 14 V, 0.85 A, and 11.9 W during daytime. The fifth solar panel 3-26 outputs 14 V, 1.0 A, and 14 W during daytime. The second solar panel 3-11 is accompanied by the second semiconductor diode 3-10 having a maximum rating of 40 V and 3 A for preventing reverse current. The solar panel 3-14 is accompanied by the semiconductor diode 3-13 having a maximum rating of 40 V and 5 A for preventing a reverse current. The solar panel 3-24 is accompanied by the semiconductor diode 3-23 having a maximum rating of 100 V and 3 A for preventing reverse current. The solar panel 3-26 is accompanied by the semiconductor diode 3-25 having a maximum rating of 100 V and 3 A for preventing a reverse current.

Figure 17:
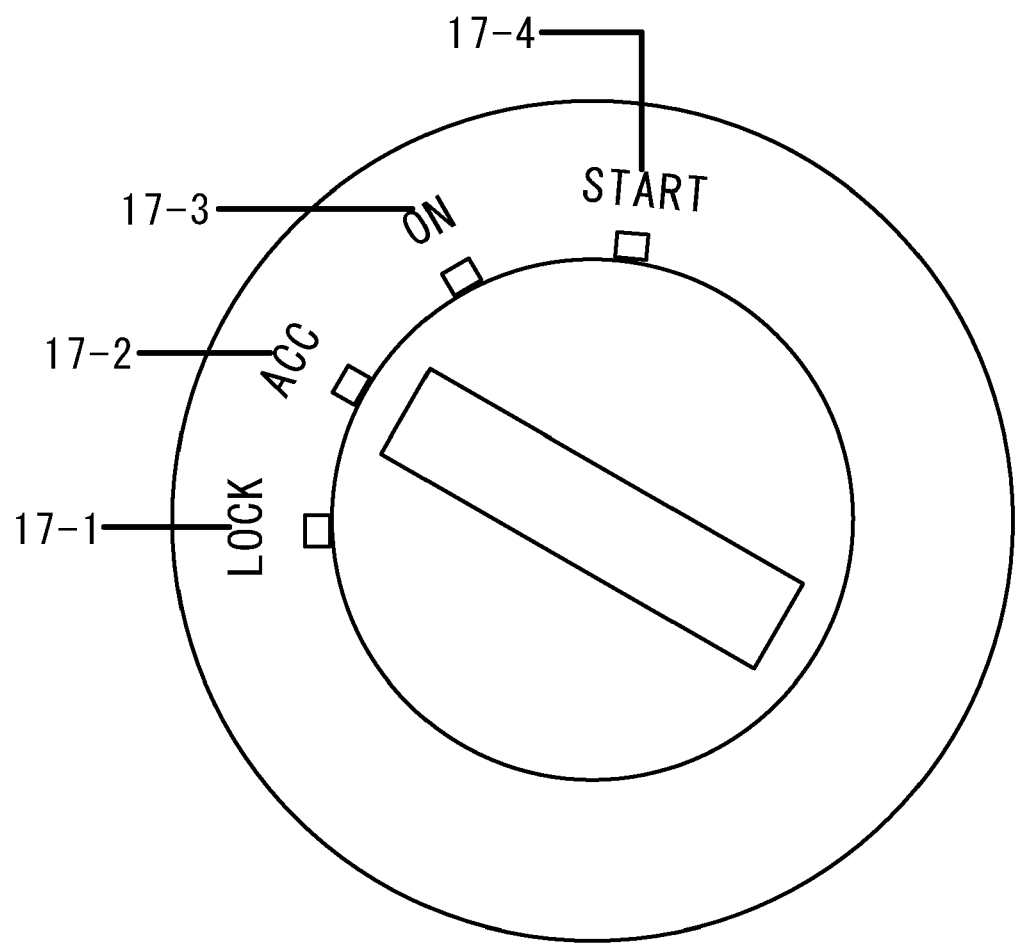
FIG. 17 is an illustration of the structure of an ignition switch (an Ignition key cylinder) of commonly used type having the positions of "LOCK, ACC, ON, START".

In order to be the solar panels 3-11, 3-14, 3-24, and 3-26 as connection at the time of automobile use, an ignition switch 17 as shown in FIG. 17 and a relay function are used. When the key of the automobile is twisted in ignition, the solar panels 3-11, 3-14, 3-24, and 3-26 are connected to positive pole of the DC-battery 3-1 in the case of the positions "on" and "acc", and are not connected to the positive pole of the DC-battery 3-1 in the case of the positions of "lock" and "start." For example, the fuse allows the connection only in the case of "on" and "acc" when ignition is twisted. Relays 3-4, 3-15, 3-16 allow the connection at the time of automobile use in case keys are "on" and "acc".

Toggle switches 3-2, 3-17 and 3-18 choose either the position "always-on connection" as shown in position A where the toggle switch does not have a relay, or the position "connect at the time of automobile use" as shown in position B with a relay with a switch tongue. Code 3-3 denotes the changeover of the switch tongue. The switch 3-2 is changed over the relay 3-4 of the position B in FIG. 3. In case the switch 3-2 is switched to position A, the solar panels are always connected to the positive pole of battery 3-1. The toggle switches 3-17 and 3-18 are similar to the switch 3-2. Toggle switches are switched over to position B with a relay circuit during non-use of the automobile. The reason for this has been stated. The tongue of a toggle switch itself is put in a place where the driver can operate it from the driver's seat. It is installed immediately in the on/off switch tongue group side. The driver can change freely the tongue of toggle switches. The reason or this has been described.

The specification of the 2nd embodiment differs from that of the 1st embodiment in that the semiconductor diodes 3-21 and 3-22 have a maximum rating of 200 V and 60 A at the time of automobile use of the 1st embodiment. For a further enlargement of the solar panels, the diode 3-21 and 3-22 are attached in order to prevent much electrical input to the DC-battery from the solar panels. Too much overcharge of the DC-battery is undesirable. The DC-battery 3-1 should be first taken into consideration when the overcharge occurs in the 2nd embodiment of FIG. 3. The capacity of the DC-battery 3-1 is much larger than that of the 1st embodiment due to the solar panel 3-24 of 4 14 V, 0.85 A, and 11.9 W output and the solar panel 3-26 of 5 14 V, 1.0 A, and 14 W output. In order to prevent much generation of electric power input into the DC-battery 3-1, the semiconductor diodes 3-21 and 3-22 are attached. Although connection of the AC dynamo 3-28 and the DC-battery 3-1 are connected with the dotted line which means the connection of positive poles.

The toggle switch 3-19 shown in FIG. 3 is provided for the strong sunlight of season such as a summer. In such a season, the switch 3-19 is switched to another position from the position shown in FIG. 3 so as not to supply the electric generating power of the solar panels 3-11 and 3-14 to the DC-battery 3-1. The position shown in FIG. 3 makes the electric generating power for standard or weak sunlight to output of the panels 3-11 and 3-14 is input to the DC-battery 3-1. The reference numeral 3-27 denotes an example of electrical and electronic apparatus for light.

According to the 3rd embodiment of FIG. 4, the solar panel apparatus 4-7 and 4-12 are separately placed in the inside of the front and the rear windowpane, respectively and are fundamentally the same structure as the apparatus 2-7 and 2-12 of the 1st embodiment. All of the panels are unable to be installed in the inside of the automobile due to the enlargement of the panels as compared with the 2nd embodiment. Part of the solar panels is premised to install outside the automobiles, such as a roof. The solar panels 4-24 and 4-26 are divided to be placed on inside and outside of the automobile.

FIG. 4 shows a solar apparatus of a third embodiment which is similar to the apparatus of the second embodiment of FIG. 3. Hereinafter, differences between the apparatus of FIGS. 3 and 4 will be mainly described. In FIG. 4, the all time connection of "always-on connection" is made with respect to the solar panel 4-9 with 15 V, 0.02 A, and 0.3 W of small output in the daytime, and this panel 4-9 has the light income control shutter plate, a generating power stepless modification controller with the shutter plate as shown in FIG. 5. The semiconductor diode 4-8 having a maximum rating of 30V and 0.45 A prevents current flow from the battery 4-1 to the solar panel 4-9. The diode prevents the electrical and electric apparatus of the DC-battery 4-1 being opened, and passing along the inside of the solar panel 4-9. The wiring of the diode 4-8 and a stepless light income control shutter 5-1 of FIG. 5 has been mentioned. During running, power is stably inputted from an AC dynamo, and also inputted from the solar panel 4-9. The on/off switch 4-6 can be turned off manually by the driver to prevent an overcharge of the power.

The solar panel 4-11 outputs 15V, 0.07 A, and 1.05 W during daytime. The solar panel 4-14 outputs 14 V, 0.4 A, and 5.6 W during daytime. The solar panel 4-24 outputs more power than the panel 3-24 of the 2nd embodiment of FIG. 3, 14 V, 0.85 A, and 11.9 W. The solar panel 4-26 outputs more than the panel 3-26 of the 2nd embodiment of FIG. 3 14 V, 1.0 A, and 14 W. The solar panel 4-11 is accompanied by the semiconductor diode 4-10 having a maximum rating of 40 V and 3 A for preventing reverse current. The solar panel 4-14 is accompanied by the semiconductor diode 4-13 having a maximum rating of 40 V and 5 A for preventing reverse current. The solar panel 4-24 is accompanied by the semiconductor diode 4-23 which has three or more times of the electrical voltage and current which the solar panel 4-24 outputs in the maximum rating for preventing reverse current. The solar panel 4-26 is accompanied by the semiconductor diode 4-25 which has three or more times of the electrical voltage and current which the solar panel 4-26 outputs in the maximum rating for preventing reverse current.

Solar panels 4-11, 4-14, 4-24, and 4-26 connected at the time of automobile use, an ignition switch and a relay function are used. That is, when the key of an automobile is twisted in the ignition, the current flows to the positive pole of a DC-battery only in the case of "on" and "acc", and wiring of not being connected is used, when the electrical and electric apparatus is an outflow and keys are "lock" and "start." For embodiment, this wiring can be made, if approaches, such as the flowing fuse tying to the positive pole of a DC-battery only in the case of "on" and "acc", are taken when ignition is twisted. With a relay 4-4, 4-15, and 4-16, connection is made at the time of automobile use in case position of the ignition switch 4-34 is "on" and "acc".

About toggle switches 4-2, 4-17, and 4-18 what can choose electric flow as the direction "always-on connection" of position A where this toggle switch does not have a relay, or the direction "connect at the time of automobile use" of position B with a relay with a switch tongue. It is shown that wiring changes if 4-3 moves a toggle switch tongue. The place by which through connection is made in lead wire in "FIG. 4" to the relay 4-4 of the direction of position B. If a tongue is changed and it is the direction of position A, it will be connected from a toggle switch through lead wire to the positive pole of a DC-battery 4-1, and will always be connected. The position A connection means "always-on connection." The position B connection means "connecting at the time of automobile use." The toggle switches 4-2, 4-17, 4-18 of how to catch the concept of the direction "always-on connection" of the position A without a relay and the direction "to connect at the time of automobile use" of position B with a relay is the same, and when not riding in an automobile, the toggle switch is surely moved in the direction of position B with a relay circuit. The reason for this has been described. The tongue of a toggle switch itself was put in a place which can be operated from the driver's seat, and it was installed immediately in the on/off switch tongue group side. The change which a designer considers although what is necessary is just to change it freely if the change of the tongue of a toggle switch understands the automobile operator for reason.

FIG. 4 (the 3rd embodiment) and FIG. 2 (the 1st embodiment) differ notably in that the 3rd embodiment features attached semiconductor diodes 4-21 and 4-22 having a maximum rating of 200 V and 60 A, and a maximum rating of 200 V and 60 A, respectively. At the time of automobile use of (the 1st embodiment), for the further enlargement of a connected solar panel, this was attached in order not to move a large amount of electrical input to a DC-battery from a solar panel. A DC-battery does not desire too much overcharge. Moreover, put in another way, although the cure against overcharge should be first taken into consideration when the big electrical and electric apparatus occurs by the specification of this the 3rd embodiment FIG. 4, it will become a DC-battery 4-1. The 1st embodiment with respect to the 3rd embodiment comprises solar panel No. 4 4-24 solar panel No. 5 4-26 and the solar panel generator are large. 4-24 4-26 in order not to make electric generating power input into a DC-battery 4-1, semiconductor diode 4-21 and 4-22 are attached. Although connection of an AC dynamo 4-28 and the DC-battery 4-1 is indicated with the dotted line, which means the connection of positive poles.

The toggle switch 4-19 of FIG. 4 is similar to that of FIG. 3. This toggle switch being what was prepared for the strong day of strong seasons of sunlight, such as a summer, and sunlight, and not making the electric generating power of a part connected solar panels 4-11 and 4-14 to the direction side where FIG. 4 is not connected input into a DC-battery 4-1 for a strong season of sunlight and in the daytime. The overcharge to a DC-battery is avoided. The state of connection of FIG. 4 is making the electric generating power of panels 4-11 and 4-14 input into a DC-battery 4-1 is a setup for weak sunlight.

In FIG. 4, in case that the user would like to cut a connection between the solar panel and the automobile, and use the electricity power of the solar panel for the notebook computer used in the automobile and the electric appliances which lengthen and take the electrical and electric apparatus from the automobile in code, and are used outdoor. An output terminal 4-33 is taken out from the wiring connecting the battery 4-1 and the panels. The voltage of the terminal 4-33 is set to DC 12V or more. The user can increase the voltage from DC 12V to AC 100V by using the converter which is sold at a low price at local stores. In consideration of possibility that an unstable element will be generated with respect to the electricity which flows to and from the automobile, the on/off switch 4-29 and 4-30 are attached in order to cut the unstable element. Toggle switches 4-31 and 4-32 are provided to cut the unstable element by the electricity with the automobile, and are set to change between "always-on connection with a DC-battery", and "the power source for the exteriors which is independent of the automobile".

FIG. 5 shows a shutter apparatus 5-1 in which a solar panel 5-2 is installed. The solar panel 5-2 is selected from either one of the solar panels 2-9, 3-9, and 4-9. The shutter apparatus 5-1 comprises a container 5-3, a shutter plate 5-4, a gap 5-5, a slot 5-6, a lead wire 5-7 and 5-8. Light income can be adjusted by sliding the shutter plate 5-3 in longitudinal direction to change width of the gap 5-5. Light passes through a gap so that the light reaches the solar panel 5-2. The shutter plate 5-4 consists of lightproof material. The container 5-3 holds the shutter plate 5-4 at the upper portion such that the plate 5-4 can slide. An additional shutter (not shown), such as groundglass appearance or blue transparent plate, may be provided under the plate 5-4. The additional plate is taken in and out under the shutter plate 5-1. Variable effectiveness can be enjoyed. The gap 5-5 is basically narrow in this embodiment. Lead wire 5-7 connects to the negative pole of the DC-battery with parallel connection. Lead wire 5-8 connects to the positive pole of the DC-battery with parallel connection.

FIG. 6 shows a solar apparatus of a fourth embodiment. FIG. 6 shows the apparatus F1-c of FIG. 1. While a solar panel 6-1 of the "always-on connection" generates electricity, and the electricity circulates to the automobile body and the part among the grounding points which are connected with the automobile end 6-3 and the end 6-4, respectively. The solar panel 6-1 is provided for the purpose of electrically preventing corrosion.

The maximum output of the solar panel 6-1 is between 14 V, 3 A and 0.25 V, 0.03 A, i.e., at values at which electricity does not usually have an effect on the human body and does not cause fire.

An on/off switch 6-2 is connected to the panel 6-2 and end 6-4. The driver can operate the on/off switch 6-2 to stop the flow of electricity under circumstances. A reason why a semiconductor diode is not installed in this circuit is that it may make the driver feel unpleasant. According to the apparatus of FIG. 6, electricity flows in the automobile metal body on which an anticorrosive coat is deposited, thereby exhibiting an electric anticorrosion phenomenon, the reduction of the dirt adhesion to the automobile and automobile parts, the effect of the automobile body protection pill coated on the anticorrosive coat to be more powerful, long life time, and the increase of gloss. The apparatus of FIG. 6 cannot directly contribute to the improvement of the mileage. Terminals of the solar panel 6-1 are connected ground 6-3 at one end of the body, and are connected to ground 6-4 via the switch 6-2 at the other end of the body. According to the above-mentioned structure of the body ground 6-3 and 6-4, electric resistance becomes relatively low, and the firing of the sparking plug is more clean and strong at the gasoline engine automobile thereby contributing the improvement of the mileage indirectly.

Figure 7:
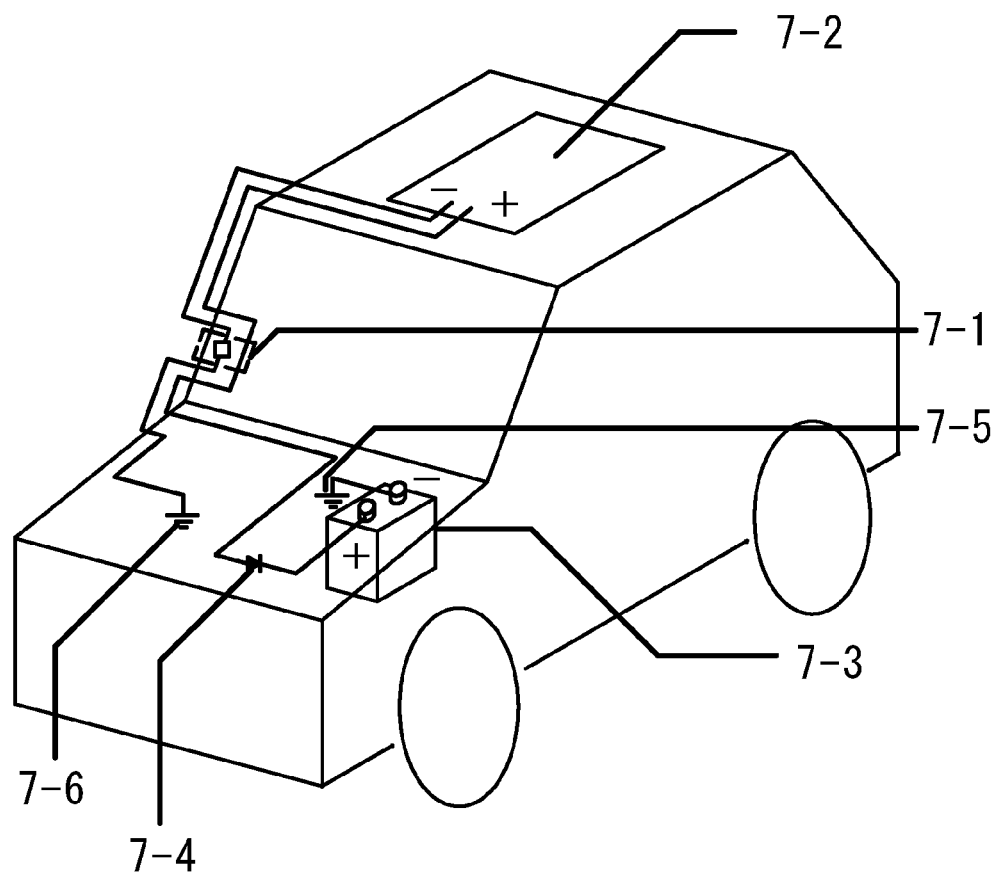
FIG. 7 is a perspective view of a fourth embodiment of this invention.
Figure 8:
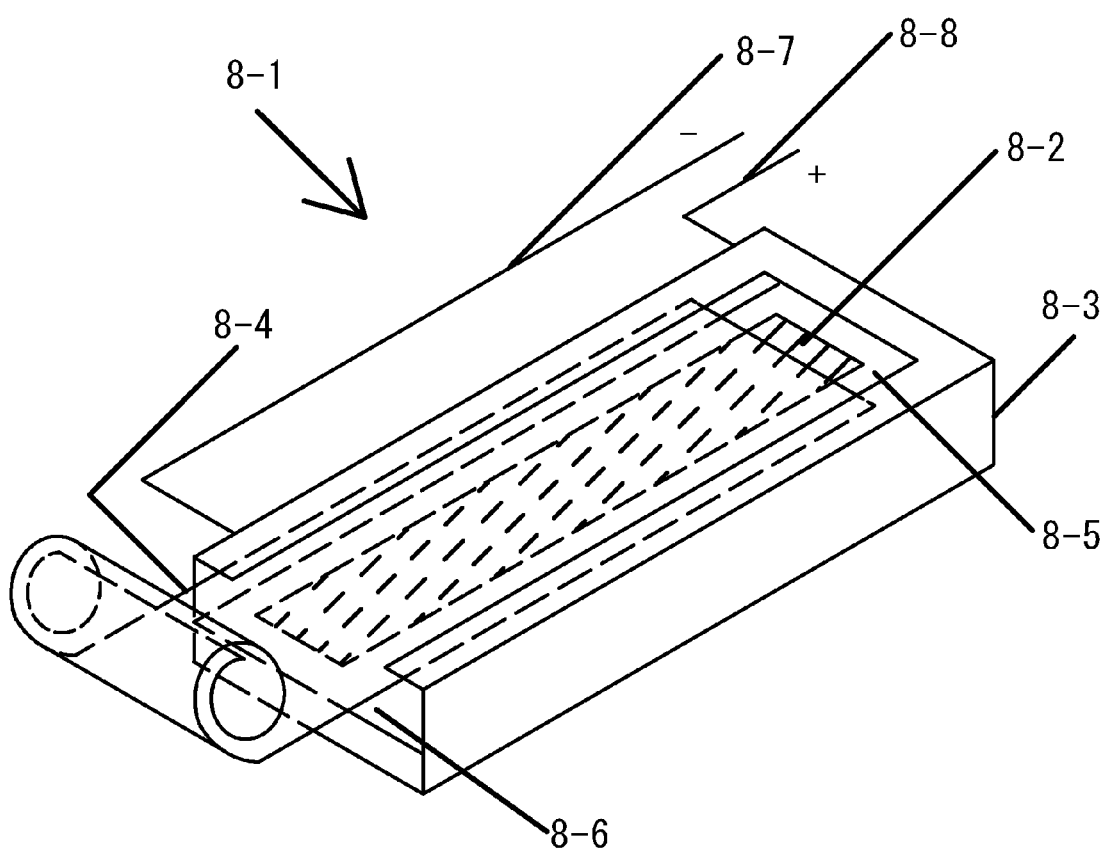
FIG. 8 is a perspective view of a shutter apparatus of this invention.
Figure 15:
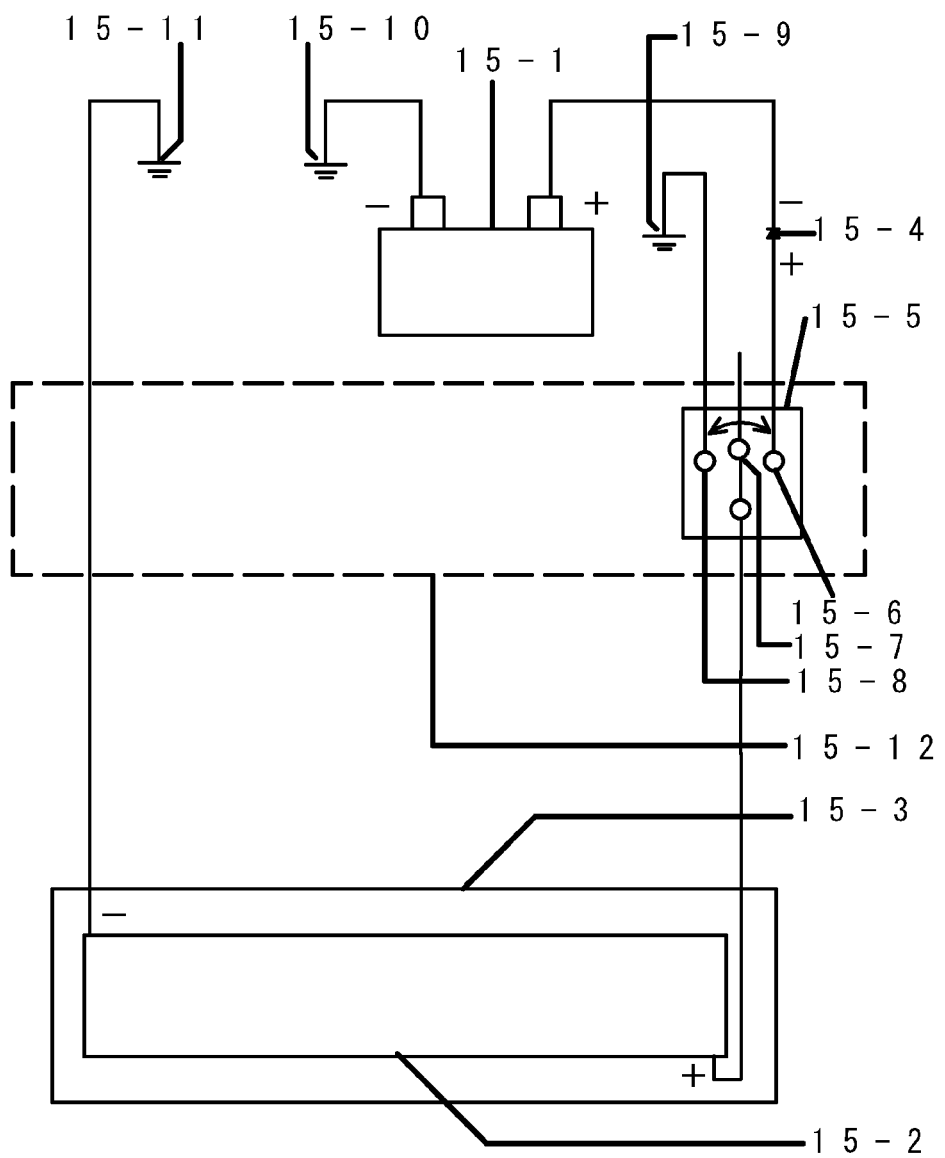
FIG. 15 is a block schematic diagram of a twelfth embodiment of this invention.
Figure 16:
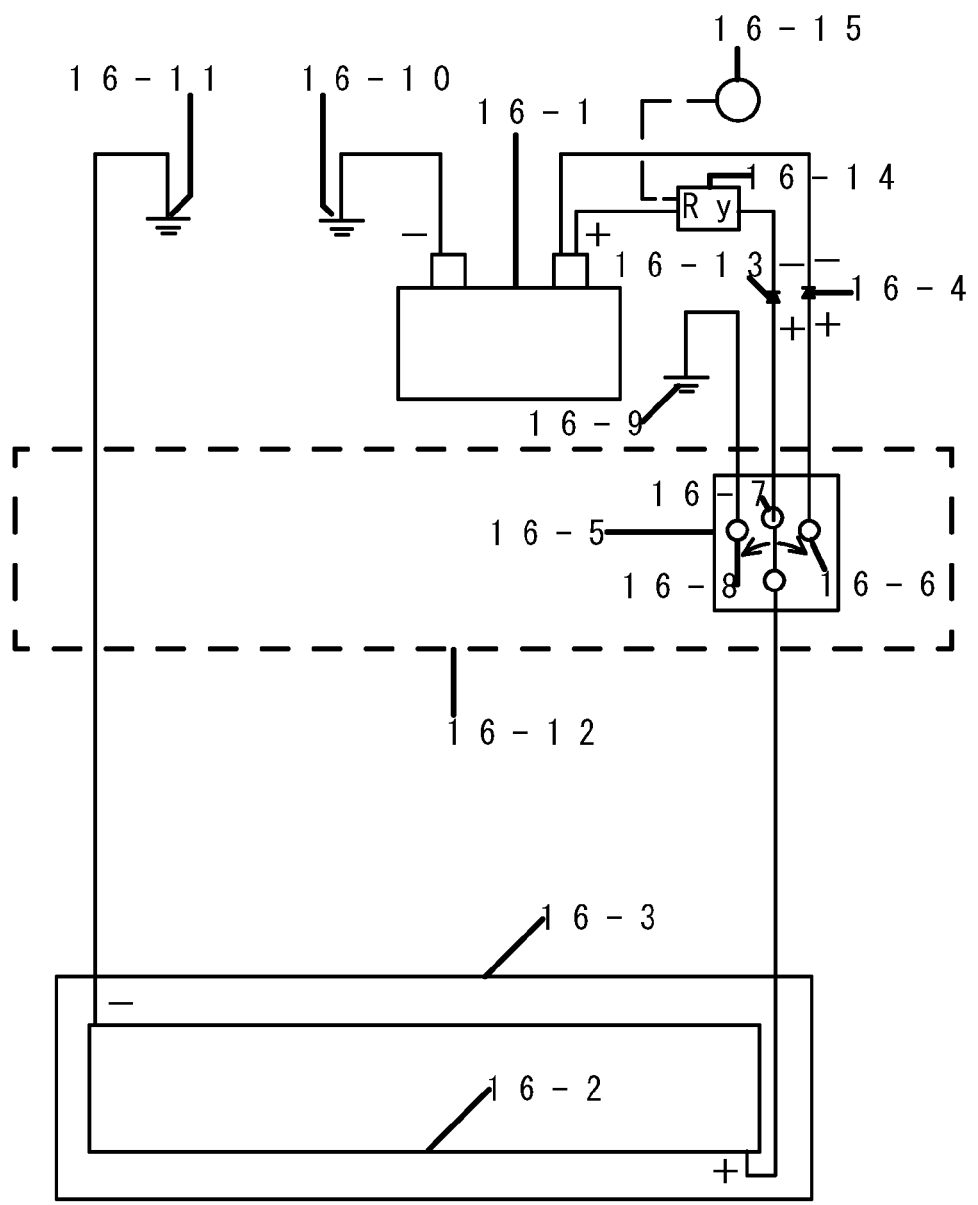
FIG. 16 is a block schematic diagram of a thirteenth embodiment of this invention.

FIG. 7 shows a solar apparatus of a fifth embodiment which is similar to the apparatus of the fourth embodiment of FIG. 6. Hereinafter, differences between the apparatus of FIGS. 6 and 7 will be mainly described. FIG. 7 shows an apparatus for the electric output from a solar panel 7-2 by means of equal to or more than two steps. The dotted line part 7-1 of the square dotted line shows the switch and wiring. The dotted line parts 9-6, 10-9, 11-7, 12-8, 13-13, 14-12 are similar structure to the dotted line part 7-1. The switch and the wiring are changed in the respective figure. Wiring turns into the interior of the automobile for the driver to touch the switch from inside the automobile. The large size or the medium size solar panel 7-2 is joined to the automobile battery 7-3 in parallel connection through the circuit 7-1 and a semiconductor diode 7-4 which is the countercurrent prevention circuit by the semiconductor such a Schottky diode and so on. The electricity supplied from the panel 7-2 to the battery 7-3 can be cutoff by operating the switch of the circuit 7-1. The output of the panel 7-2 can be controlled by the shutter apparatus as shown in FIG. 8 in which the panel 7-2 is installed so as to decrease electric power. A negative terminal of the battery 7-3 is connected to ground 7-5. A negative pole of the panel 7-6 is connected to ground 7-6 via the circuit 7-1. The negative pole from the solar panel 7-2 may be connected to the negative pole of the battery 7-3 as shown in FIGS. 9-14, or may be connected to the cylinder head of a gasoline engine. The ground 15-9-15-11 of FIG. 15 and the ground 16-9-16-11 of FIG. 16 are similar to the ground 7-5 and 7-6 of FIG. 7. In FIGS. 9, 10, 11, 12, 13, and 14, the balance with the resistance value of the resistors must be considered.

Figure 9:
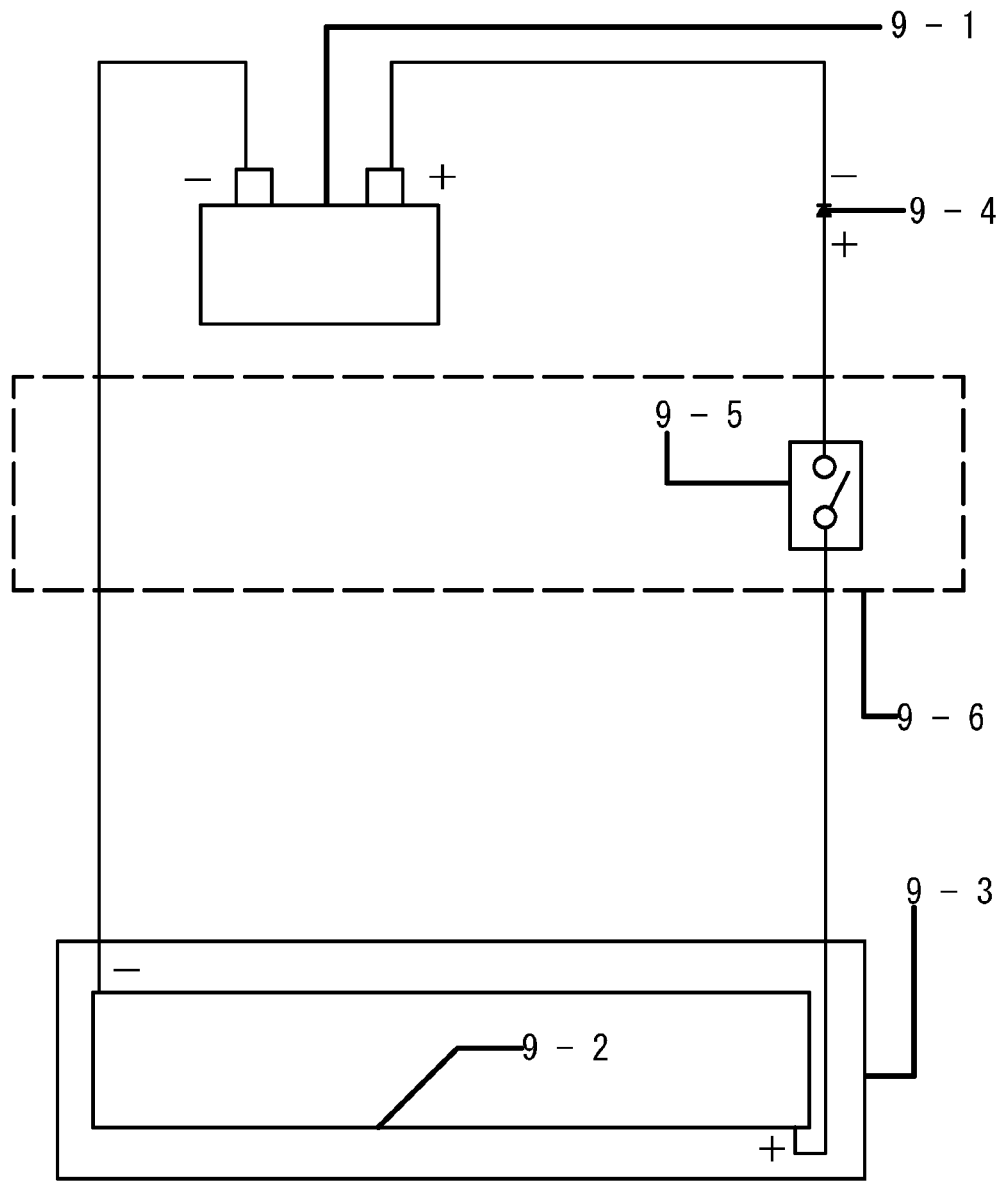
FIG. 9 is a block schematic diagram of a fifth embodiment of this invention.

FIG. 8 shows a shutter apparatus 8-1 which is equal or similar to the shutter of FIG. 5, and so, hereinafter, differences between the shutter 5-1 and the shutter 8-1 will be mainly described. The shutter plate 8-4 of the metal and cloth and so on, which can be bended or rolled up in a longitudinal end for compact size. The shutter apparatus 8-1 can cover the solar panels as shown in FIGS. 9-16, and preferably used to the solar panels as shown in FIGS. 9, 15 and 16. In FIGS. 10-14, it is possible to generate the feeble electricity power input by wiring without shutter apparatus 8-1. In FIG. 5, there is provided with an on/off switch 9-5, and in FIGS. 15 and 16, there is provided a toggle switch. The apparatus as shown in FIGS. 9 can be used with the shutter apparatus 8-1 by deleting a switch 9-5 and wiring directly a solar panel 9-2 and a diode 9-4. The apparatus as shown in FIGS. 9 can be used without the shutter apparatus 8-1 because there is provided with an on/off switch 9-5. The apparatus as shown in FIGS. 15 and 16 can be used without the shutter apparatus 8-1 because there is provided with toggle switch of FIGS. 15 and 16.

According to FIG. 9 of a solar apparatus of a sixth embodiment, a positive pole of a solar panel 9-2 is connected to a positive pole of a DC battery 9-1 via a diode 9-4 and an on/off switch 9-5. A negative pole of the solar panel 9-2 is connected to a negative pole of the DC battery 9-1. The diode 9-4 has a countercurrent prevention function by the semiconductor such as a Schottky diode and so on. The large-sized solar panel apparatus 9-3 is put on the roof and so on of the automobile. To avoid the overcharge of the battery 9-1, the switch 9-5 is cut off when the automobile is not used or the enough charging is finished. When there is shortage of the charge of the battery 9-1, the battery 9-1 is switched on. It is preferable to control the charging amount by using a microcomputer. The dotted line part in FIG. 9 functions like the block 7-1 in FIG. 7.

Figure 10:
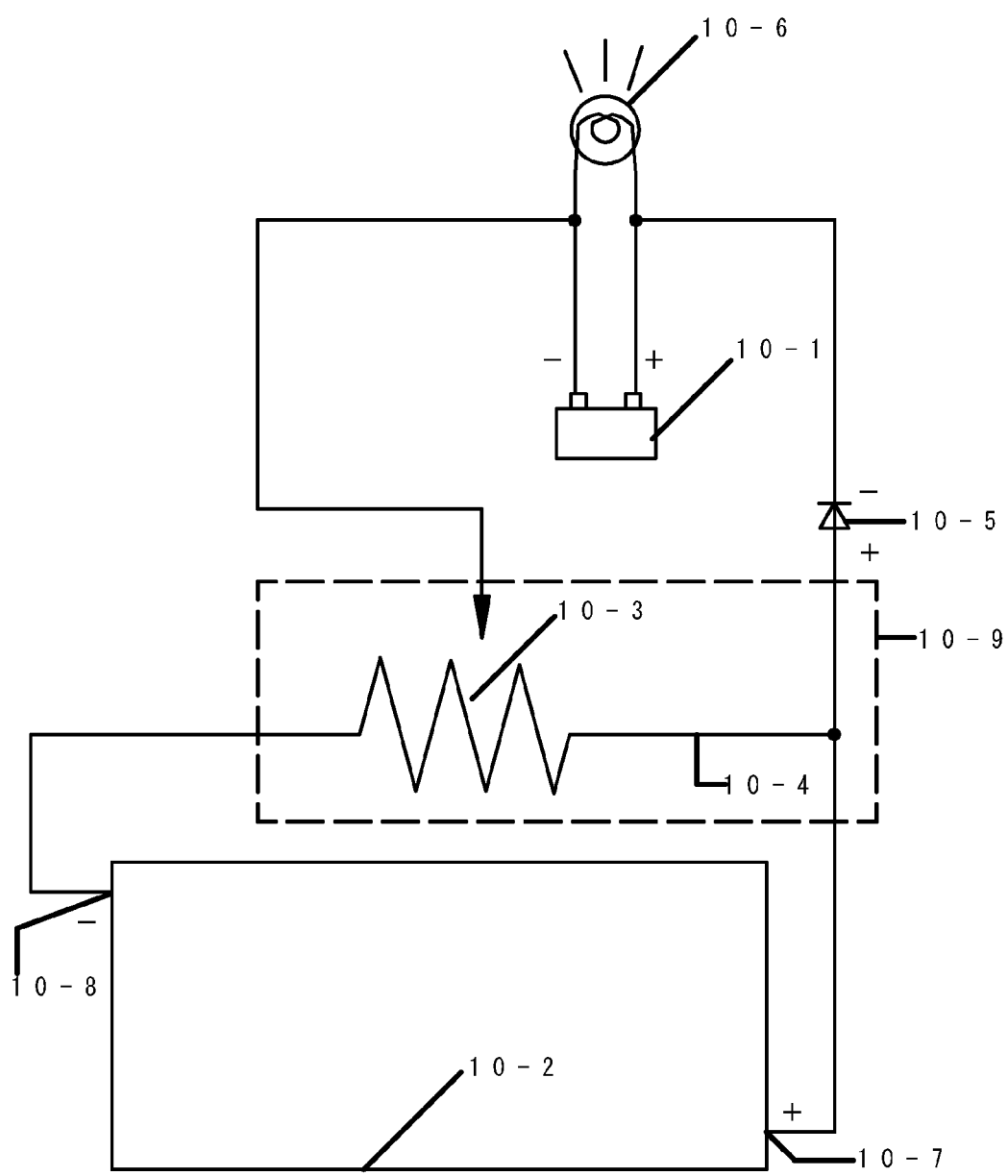
FIG. 10 is a block schematic diagram of a sixth embodiment of this invention.

FIG. 10 shows a solar apparatus of a seventh embodiment which is similar to the apparatus of FIG. 9, and so, hereinafter, differences between the apparatuses of FIGS. 9 and 10 will be mainly described. A potentiometer 10-3 and ground line 10-4 is provided in the dotted line part 10-9. The potentiometer 10-3 is connected to the battery 10-1, a diode 10-5, and terminals 10-7, 10-8. An amount of electric voltage and current is controlled by the potentiometer 10-3 of three pole type and of the ground-type. It is preferable for the potentiometer 10-3 to handle small amount of electric power. The large-sized solar panel 10-2 is 70 W class d an electric current mainly or small. An electrical apparatus 10-6 is provided with the battery 10-1.

Figure 11:
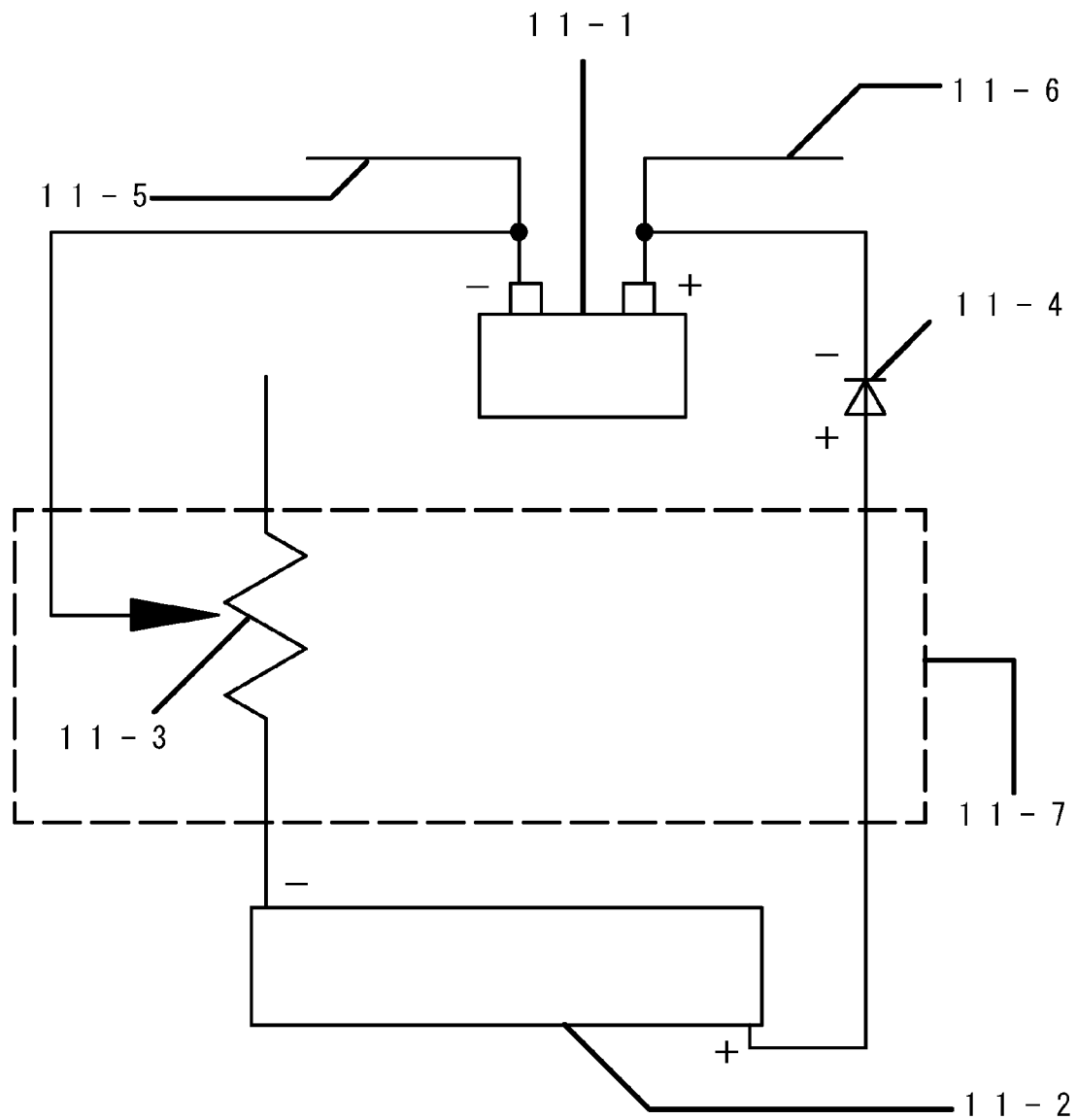
FIG. 11 is a block schematic diagram of an eighth embodiment of this invention.

FIG. 11 shows a solar apparatus of the eighth embodiment which is similar to the apparatus of FIG. 10, and so, hereinafter, differences between the apparatuses of FIGS. 10 and 11 will be mainly described. A potentiometer 11-3 which doesn't have the ground connect, and so on, is a type of two pole, and is provided with a dotted line part 11-7. To prevent the overcharge of the battery 11-1 when not using an automobile, the potentiometer 11-3 send small amount of electric power, on the other hand, when using a automobile, it send large amount of electric power. The reference numeral 11-5 denotes a negative terminal and 11-6 denotes a positive terminal.

Figure 12:
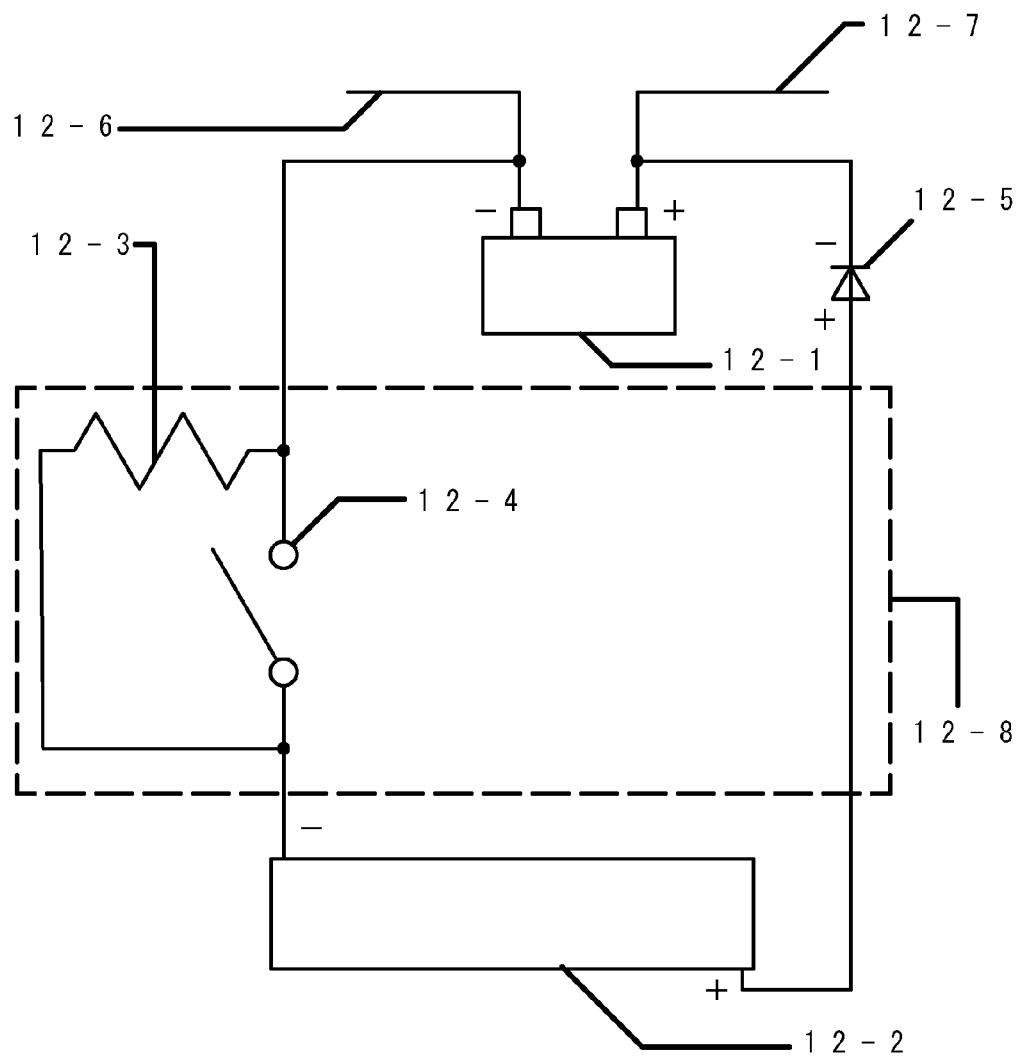
FIG. 12 is a block schematic diagram of a ninth embodiment of this invention.

FIG. 12 shows a solar apparatus of the ninth embodiment which is similar to the apparatus of FIG. 11, and so, hereinafter, differences between the apparatuses of FIGS. 11 and 12 will be mainly described. A resistor 12-3 and an on/off switch 12-4 are provided in a dotted line part 12-8. In case the on/off switch 12-4 is open, electric current passes through the resistor 12-3. The resistance value and the maximum durability of the resistor 12-3 are set in consideration of the generation of electricity of the solar panel 12-2 and the internal resistance of the diode 12-5. When the automobile is not in use, the switch 12-4 is cut off. The resistance value of the resistor 12-3 is set between 0.01 W and 0.04 W to avoid overcharging the battery 12-1.

Figure 13:
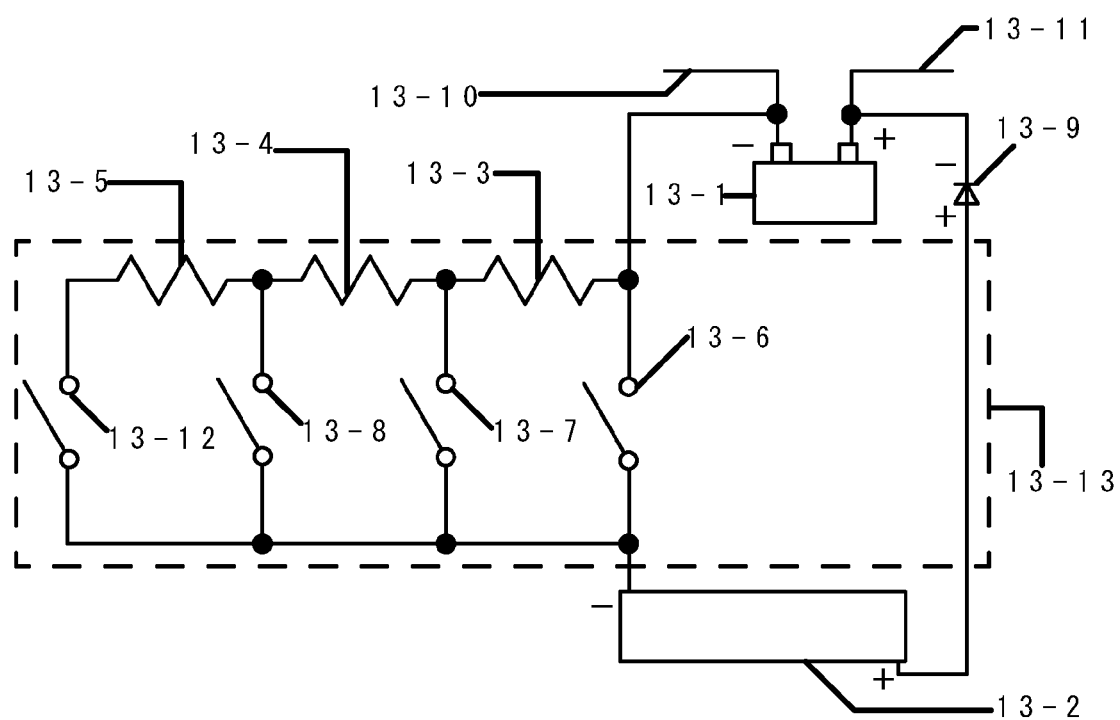
FIG. 13 is a block schematic diagram of a tenth embodiment of this invention.

FIG. 13 shows a solar apparatus of the tenth embodiment which is similar to the apparatus of FIG. 12, and so, hereinafter, differences between the apparatuses of FIGS. 12 and 13 will be mainly described. The quantity of the electricity is adjusted according to three-step model via three resistors 13-3, 13-4, 13-5 and four on/off switches 13-6, 13-7, 13-8, and 13-12 which are provided in the dotted line part 13-13. The quantity is set to "all of nothing", or "a few", or "the quantity as much as the half" model as the example and so on. The resistance values and the maximum durability of the resistors 13-3, 13-4, 13-5 are set in consideration of the generation of electricity of the solar panel 13-2 and the internal resistance of the diode 13-9.

Figure 14:
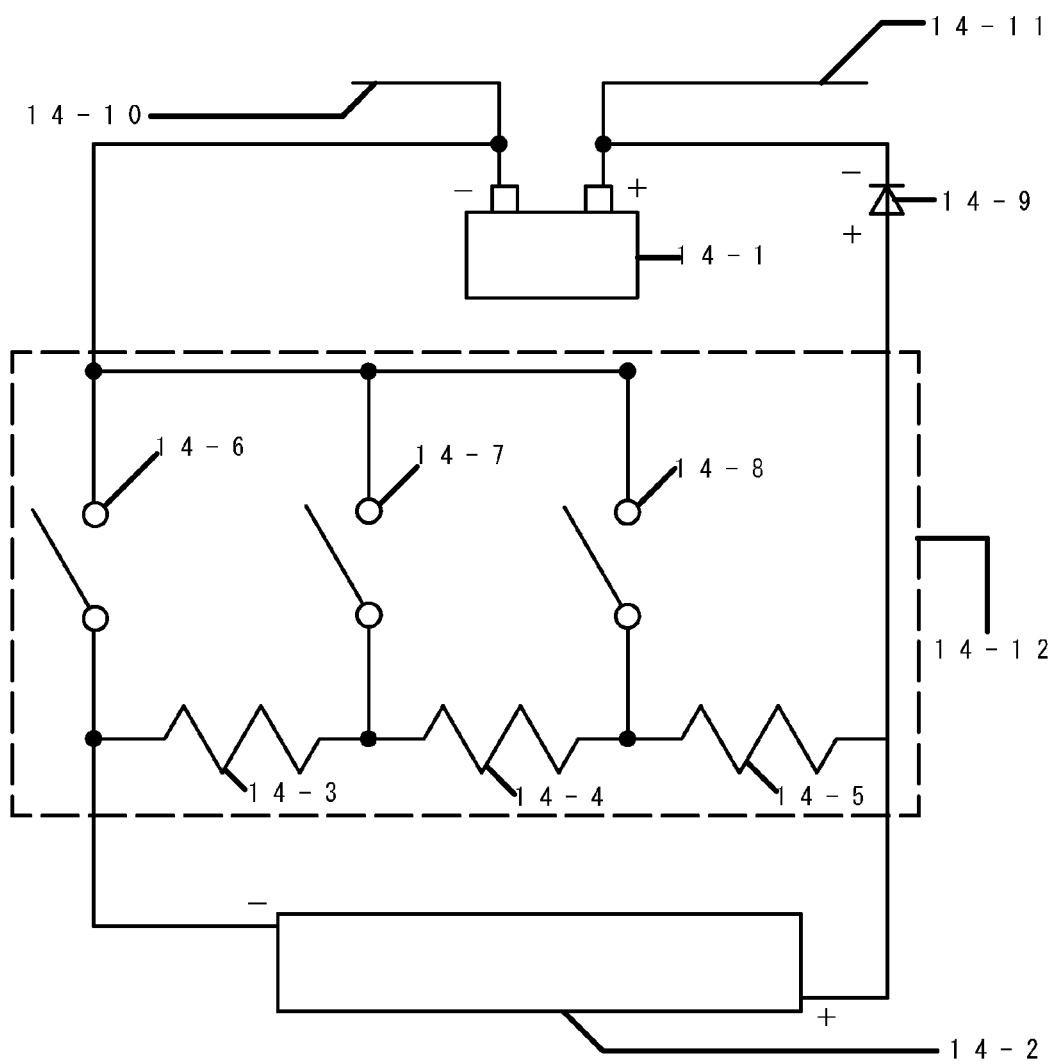
FIG. 14 is a block schematic diagram of an eleventh embodiment of this invention.

FIG. 14 shows a solar apparatus of an eleventh embodiment which is similar to the apparatus of FIG. 13, and so, hereinafter, differences between the apparatuses of FIGS. 13 and 14 will be mainly described. Resistors 14-3, 14-4, 14-5 and on/off switches 14-6, 14-7, 14-8 and 14-9 in parallel connection are provided in a dotted square line part 14-12 of the three pole type. Values of the resistors 14-3, 14-4 are greater than a value of the resistor 14-5. By selecting state of the on/off switches 14-6, 14-7, 14-8 and 14-9, charge amount can be selected at three different settings: small, medium, and large.

FIG. 15 shows a solar apparatus of a twelfth embodiment which is similar to the apparatus of FIG. 9, and so, hereinafter, differences between the apparatuses of FIGS. 15 and 9 will be mainly described.

A toggle switch 15-5 is a three pole type switch. In case that the toggle switch 15-5 is in position 15-6, the positive pole of a solar panel 15-2 connects to a positive pole of the DC battery 15-1 so that the battery 15-1 is charged by the solar panel 15-2. When the toggle switch 15-5 is in a position 15-7, no current is conducted so that the switch is in off state. When the toggle switch 15-5 is in a position 15-8, the positive pole of the solar panel 15-2 is grounded via ground 15-9, ground 15-10, the body metal, and ground 15-11. The electric power, which is generated at the solar panel 15-2, circulates in the body metal of the automobile, and the electric anticorrosion phenomenon occurs on the automobile body thereby improving the mileage. A negative pole of the DC-battery is provided with the ground 15-10. The ground 15-11 is preferably the cylinder head of the gasoline engine. The position 15-7 can be deleted so that the switch 15-5 is a two pole type switch.

FIG. 16 shows a solar apparatus of the thirteenth embodiment which is similar to the apparatus of FIG. 15, and so, hereinafter, differences between the apparatuses of FIGS. 15 and 16 will be mainly described.

A toggle switch 16-5 is a three pole type switch. In case that the toggle switch 16-5 is in a position 16-6, a positive pole of a solar panel 16-2 connects to a positive pole of DC-battery 16-1 via a diode 16-4 so that the battery 16-1 is charged by the solar panel 16-2. When the toggle switch 16-5 is in a position 16-7, the positive pole of the solar panel 16-2 connects to the positive pole of DC-battery 16-1 via a diode 16-13 and a relay 16-14 to which the key cylinder 16-15 connects, so that the battery 16-1 is charged by the solar panel 16-2. When a key inserted into the key cylinder 16-15 is in a position of "ON", "ACC", the battery 16-1 is charged. In case that the toggle switch 16-5 is in a position 16-8, the poles of the solar panel 15-2 are grounded via a ground 16-9, the body metal, and a ground 16-11 so that the electric power, which is generated at the solar panel 16-2, circulates in the body metal of the automobile. A negative pole of the DC-battery is provided with a ground 16-10. The ground 16-11 is preferably the cylinder head of the gasoline engine. Such a switching may be attained by computer control. The position 16-7 can be deleted so that the switch 15-5 is a two pole type switch.

FIG. 17 shows the key cylinder (ignition key cylinder) where the reference numeral 17-1 denotes a LOCK position, the reference numeral 17-2 denotes an accessory position, ("ACC"), the reference numeral 17-3 denotes the ON position ("ON"), and the reference numeral 17-4 denotes the START position.

This invention may be applied to a diesel automobile, a propane automobile, an LPG automobile, a hybrid automobile, an ambulance vehicle, an airplane, e.g., a jet airliner, a Cessna or a structurally similar airplane, or an auxiliary device of an auxiliary power unit APU.

It is possible that smooth electricity inflow is attained and the driver need not switch an on/off switch and a toggle switch with his hand when a microprocessor controls electric power supplied by the solar panel. It is possible to adjust electric power quantity by the combination of the set resistors and the microcomputer. A wide variety of switching features described in the various above embodiments may be controlled by a microprocessor.

While there has been described what is at present considered to be preferred embodiment of the invention, it will be understood that various modifications may be made therein, and it is intended to cover in the appended claims all such modifications as fall within the true scope of the invention.

What is claimed is:

1. A solar-panel apparatus for a vehicle comprising:
an ignition switch;
a battery;
a solar panel; and
an electrical circuit connecting said ignition switch, said battery and said solar panel;
wherein
said electric circuit connects said battery and said solar panel when said ignition switch is in "on" or "acc" positions; and
said solar panel is provided with a switch for switching a supply state when electric output is supplied from said solar panel to said battery and a circulation state when a positive pole and a negative pole of said solar panel are connected to both ends of a body metal of said vehicle, respectively so that said solar panel functions as an electric current circulation apparatus.

2. A solar-panel apparatus for a vehicle comprising:
a battery;
a solar panel; and
an electric circuit connecting said battery and said solar panel;
wherein
both ends of a body metal of the vehicle are connected to a positive pole and a negative pole of said solar panel, respectively, so as to circulate electrical current through said body metal.

\* \* \* \* \*